US012120166B2

(12) United States Patent  
Badal-Badalian et al.

(10) Patent No.: US 12,120,166 B2  
(45) Date of Patent: Oct. 15, 2024

(54) SYSTEM AND METHOD FOR MULTI-USER SESSION FOR COORDINATED ELECTRONIC TRANSACTIONS

(71) Applicant: ROYAL BANK OF CANADA, Toronto (CA)

(72) Inventors: Arnold Badal-Badalian, Toronto (CA); Edison U. Ortiz, Orlando, FL (US); William Kwok Hung Cheung, Toronto (CA); Seung Bong Baek, Toronto (CA); Ravi Khandavilli, Orlando, FL (US)

(73) Assignee: ROYAL BANK OF CANADA, Toronto (CA)

( * ) Notice: Subject to any disclaimer, the term of this patent is extended or adjusted under 35 U.S.C. 154(b) by 305 days.

(21) Appl. No.: 17/840,424

(22) Filed: Jun. 14, 2022

(65) Prior Publication Data

US 2022/0400145 A1 Dec. 15, 2022

Related U.S. Application Data

(60) Provisional application No. 63/210,249, filed on Jun. 14, 2021.

(51) Int. Cl.
*H04L 9/40* (2022.01)
*H04L 65/403* (2022.01)
*H04L 65/70* (2022.01)

(52) U.S. Cl.
CPC .............. *H04L 65/70* (2022.05); *H04L 63/10* (2013.01); *H04L 65/403* (2013.01)

(58) Field of Classification Search
CPC ........ H04L 65/70; H04L 63/10; H04L 65/403

USPC ............................................................. 726/4
See application file for complete search history.

(56) References Cited

U.S. PATENT DOCUMENTS

| | | | |
|---|---|---|---|
| 2007/0073621 A1* | 3/2007 | Dulin ..................... | G06F 21/33 705/50 |
| 2011/0256889 A1* | 10/2011 | Polis ....................... | H04L 67/02 455/456.3 |
| 2013/0086699 A1* | 4/2013 | Polis ....................... | H04L 67/53 726/29 |
| 2014/0006951 A1* | 1/2014 | Hunter ............... | H04N 21/4821 715/719 |
| 2014/0297595 A1* | 10/2014 | Larson ................. | G06F 16/219 707/648 |
| 2015/0339667 A1* | 11/2015 | Dua ........................ | G06Q 20/32 705/16 |

OTHER PUBLICATIONS

Canadian Intellectual Property Office (CIPO), International Search Report and Written Opinion issued to PCT/CA2022/050951, Sep. 12, 2022.

* cited by examiner

*Primary Examiner* — Badri Narayanan Champakesan
(74) *Attorney, Agent, or Firm* — Norton Rose Fulbright Canada LLP

(57) ABSTRACT

Systems, methods, and computer readable media are directed in various embodiments for providing multiuser sessions for coordinated electronic transactions. A technical solution is directed to coordinating the electronic transactions across a plurality of instances, where the underlying users of the instances can include at least two users. Access to sensitive information can be restricted using a trusted execution environment and access can be given in accordance with the coordinated electronic transactions.

20 Claims, 12 Drawing Sheets

SYSTEM AND METHOD FOR MULTI-USER SESSION FOR COORDINATED ELECTRONIC TRANSACTIONS

CROSS-REFERENCE

This application is a non-provisional of, and claims all benefit of, U.S. Application No. 63/210,249, filed Jun. 14, 2021, entitled "SYSTEM AND METHOD FOR MULTI-USER SESSION FOR COORDINATED ELECTRONIC TRANSACTIONS", incorporated herein by reference in its entirety.

FIELD

Embodiments of the present disclosure generally relate to the field of networked computing, and more specifically, embodiments relate to devices, systems and methods for creating a hybrid multi-user computing session where electronic transactions and operations between instances are coordinated.

INTRODUCTION

Graphical user interface instances are typically single-user focused. For example, the instance is adapted such that the user is able to perform various functions and conduct transactions. However, these graphical user interface instances are poorly adapted where collaboration is required, and undesired sharing of sensitive information may occur.

SUMMARY

Systems, methods, and computer readable media are directed in various embodiments for providing multiuser sessions for coordinated electronic transactions. A technical solution is directed to coordinating the electronic transactions across a plurality of instances, where the underlying users of the instances can include at least two users. During these instances, the instances are coupled together in certain interactions while being in separate in other interactions with one another or with a backend computing system that orchestrates the overall shared session aspects.

In a non-limiting example, the plurality of instances can be used to establish an initial shared session where the parties are able to identify common characteristics of a desired interaction with a backend system. In this initial shared session, for example, the parties can together select a specific date for a particular trip, or a product to be purchased. The initial shared session can be multi-cast across each of the individual instances for each user.

During an individual-phase portion of the checkout process, the initial shared session and the corresponding individual instances can then proceed to undergo separate workflows and state transitions such that each user is able to select individual-related options (e.g., meal selections, upgrade status), insert sensitive information such as payment information, apply discounts, individual information (e.g., submitting passport documentation, vaccination status images or exemptions thereof), among others. During this phase, the individual instances can decouple from one another, and in some embodiments, individually interact with page components and/or widgets, such as helpdesk support, chatbots, among others.

Each user, for example, at this portion of the process, can select to proceed or not to proceed with the common transaction aspects as established in the initial shared session. As described in a variation below, a reverting state transition can also be triggered if a particular user or set of users indicates, through the provisioning of a corresponding signal or data message, that the common transaction aspects are unacceptable and/or need to be varied.

After the individual-phase portion of the checkout process, the corresponding individual instances can optionally be re-united in respect of a second shared session whereby the outcomes of the various individual instances are collated together so that the transaction can proceed in whole or in part. The amount of information shared by the various individual instances can vary in what is being provided into the second shared session. For example, the information can indicate that an individual transaction or payment was consummated or not consummated, optionally indicating a price or other details (e.g., seat or meal allocations).

Certain information may be withheld in some variations, for example, through the setting of permissions and the use of privacy-enhancing or adhering function calls or hooks in the device controlling the second shared session.

As a non-limiting example, the second shared session could indicate who has finished purchasing plane tickets for a class field trip, who is still in progress. However, certain information may be withheld from the group but available to individual instances, such as price of plane tickets, fare classification, meal status, passport/residence information, etc.

The technical solution is adapted for improved collaboration while maintaining a level of technical segregation between the instances such that confidential or sensitive information is not shared at between instances. In a variation, improved isolation can be established using segregation via providing permissions via access tokens to information stored on an always protected database, which can be stored on an always protected data warehouse managed by a trusted execution environment. The implementation is adapted across platforms (mobile, web) at the same time, and to interface with merchant applications or merchant websites, or both. For example, when making a booking for multiple people, such as for a flight, the booking system might require certain personal information about each person who is the subject of the booking. A group chat may provide a way for that information to be securely shared with the merchant, but not disclosed to the rest of the group chat members, thereby retaining privacy of personal information.

The system of some embodiments instantiates an instance having secured communication pathways to individual user computing devices, which is directed to parsing and automatically treat certain information as private (e.g. passport information, information about any minors, credit card or other payment information, etc.), or may allow users to flag certain data as being private. This instance then spawns individual sessions with the user computing devices, who then provide selections/personal information that is ultimately encapsulated and provided to the target computing resource (e.g., booking website).

In a first variant example, the technical implementation uses local encryption and the sharing of encryption keys and/or certificates to establish the connections between instances and the multiplexing instance, sending encrypted or signed messages back and forth, for example, using public-private key pairs established for each of the instances. A public key of an instance can be used to sign or otherwise encrypt data messages from the instance, in respect of information that either needs verification (signing), or protection (encryption). In some embodiments, the multiplexing entity receives the data packet in the form of encrypted information for each user, which can then be provided to the merchant backend server. In this variation, the instances have either provided or provide their private keys to the merchant backend server, such that the merchant backend server is able to access the information by accessing the information directly using their corresponding encryption keys to decrypt the provided information. A benefit of this approach is that the intermediary multiplexer may not be able to access the corresponding information. For example, the information can be encrypted using a combination of another key with the public key of the merchant backend server so that the merchant backend server's private key is required for decryption. The multiplexer, in this example, would only be able to discern that the information exists but not decrypt it.

In a second variant example, the technical implementation uses a combination of privacy-adhering and automatic privacy-enhancing always encrypted trusted execution environments and always encrypted databases to establish privacy and control access. In this variant example, the automatic privacy-enhancing always encrypted trusted execution environments designate access permissions to various devices based on established roles and consent. The permissions can be established at varying levels of query access to the underlying encrypted/protected databases through interactions with the trusted execution environment that manages and/or controls access to the always protected data warehouse, controlling which data tables are loaded, what queries can be processed, or what query results can be returned (e.g., no specific values but only countOf values), or a combination thereof.

The always protected data warehouse in this example could store in various data silos the information of each user/instance and/or the merchant backend server itself, and permissions are provided via access tokens so that the merchant backend server can process the transaction by retrieving information from the always protected data warehouse. Similarly, in a variation of this example, the group session instance run by the multiplexer may also access certain information from the always protected data warehouse by running queries, but these queries can be provided at a lower level of access relative to the merchant backend server. For example, the multiplexer may be able to discern information such as relative addresses—(e.g., running queries that indicate that the closest major airport for each person), but not be able to obtain precise addresses (e.g., running queries that indicate the address for each person). Depending on the consent and privacy levels being automatically enforced for each user, the protections may be established in accordance with various privacy policy requirements and/or regulatory requirements.

Limited consent can be provided so that the multiplexer can obtain the relative addresses, etc., and full consent can be provided to the merchant backend server in this example, and consent can be established through providing corresponding permissions within the data messages themselves in the form of access tokens.

As part of the group session, in this variation, the merchant or backend server operating with the group session instances instead is given various permissions in the form of authorization messages making available different elements of information in the automatic privacy-enhancing always encrypted trusted execution environments at differing levels of privacy adherence (e.g., based on a need to know basis or on a consent basis). For example, the permissions can be established in a data structure indicating the types of permissions made to provide information to a shared session instance to provide on-going registration information (e.g., 5/12 students have purchased), which can be conducted at a group or mini-group level (e.g., student purchasing information available only to students in classroom 4A), or at a role based level (e.g., travel coordinator is able to see ticket prices but other travellers are not able to see each others').

These aspects can be practically implemented into browser permissions and capabilities through corresponding function hooks built into an application and experience, whereby access to and from the always encrypted trusted execution environments can be established as built-in functionality as part of the application, converting link permissions to queries and corresponding query results on the always encrypted trusted execution environments.

These session instances are interconnected to coordinate data transfer, and in some embodiments, improved privacy management mechanisms are automatically enforced to enhance privacy of information designated as private. Where private information is required for the ultimate encapsulated data packet to be sent to the target computing resource, each of the sessions may utilize separate instances of trusted execution environments or a centralized instance of a trusted execution environment that is adapted for coordinating and handling the sensitive information. The trusted execution environment, in some embodiments, is a specialized computing device or set of computing devices utilizing isolated or segregated computing environments that utilize cryptographic data loading mechanisms and data custodian data processes that automatically establish and enforce restrictions on the types of uses and interactions that are possible on the underlying loaded data.

The data itself is cryptographically restricted during the loading process using one or more encryption keys that are either maintained by the trusted execution environment locally in a secure computing data storage, or held by third party computing devices such as certificate authorities and released only when access is required to the loaded data. Interactions with the loaded data are restricted such that cybersecurity mechanisms are automatically enforced in accordance with agreed to protocols with the target computing resource.

In a first embodiment, the technical solution includes a multiplexer device which broadcasts or otherwise makes available a first user's session from a graphical user interface to other users. The first user's graphical user interface session is responsible for actual access to a particular computer resource, such as a merchant's website. The multiplexer device is adapted for interoperation between the first users computing device and the computing resource upon which the first user's computing device is interacting with. The multiplexer device intercepts data packets either unidirectionally or bi-directionally such that certain aspects can be transformed and shared across a network to the other users. In some embodiments, the multiplexer device is adapted to remove certain confidential information from the packets prior to delivery.

The multiplexer device can be configured to interoperate with merchant websites, in some embodiments. In this example, the merchant website may have instance state transition "hooks" built into the rendering code. When the application (e.g., browser) that is capable of operating the group sessions encounters a hook, the particular instance and corresponding group sessions can transition states, for example, initiating a initial group session state, then initiating the individual instance state, and then returning to the initial group session state or starting a new group session state after a trigger condition is met. The hooks can be HTTP callbacks, for example, or a function call established in the code of the website. When the website is being rendered, the state transitions can be coordinated when the callback is encountered by a particular instance. In some embodiments, the hook includes indications of whether a particular state or elements of information will include the designation of certain fields or elements as sensitive or not sensitive.

The multiplexer device can intercept packets from the computing resource indicative of a request for a transaction and modifies such packets prior to broadcast to the other users such that a coordinated transaction may occur as between the users. The multiplexer device, and some embodiments, receives and coordinates data packets that are received from the computing devices of the users, for example, representing one or more partial payments or delivery of personal information to the computing resource. The multiplexer device then transforms or otherwise generates or encapsulates a coordinated transaction package of data elements that can be provided to the computing resource.

In some embodiments, the coordinated transaction package does not include the data itself, but rather, links to the always protected database and corresponding permissions for the merchant device to obtain the corresponding private information through a query message interaction. A benefit of this approach is that the links can be established such that the multiplexer device does not have the ability to access the underlying information. For example, the links can include an identifier of the computing resource (e.g., merchant server), and only the computing resource, upon validation, can run the query using the link from the coordinated transaction package.

In a non-limiting simplified example, three users may be seeking to purchase flight tickets for a trip together. The three users designate one of the users as a primary, otherwise known as the first user. The first user then utilizes his or her computing device to establish a multiuser session whereby an instance of the multiplexer device is provisioned and connected. In the multiuser session, the first user provides inputs and drives the purchase flow through the computing resource of the flight ticket retailer, which may include computer servers, or other devices, hosting the website portal. The multiplexer device in this embodiment intercepts the signals being provided to the website portal or returning from the website portal and transforms the signals as data packets for broadcasting to each computing device corresponding to each of the three users. The data packets are transformed such that each of the users is able to independently provide his or her personal or transaction information, and receive confirmations and other data from the website portal that are relevant to them, and in some embodiments, the multiuser session establishes a data wall at between each of the three users such that confidential or sensitive information is not shared beyond the multiplexer device.

Accordingly, the multiplexer device transforms the received data packets and modifies the graphical user interface renderings to enable a coordinated transaction where information is segregated as between the different users. Each user through the multiplexer device is able to pay separately and provide information separately to the website portal, and some embodiments, separate confirmations are received.

In a second embodiment, rather than having a first user whose computing device drives the interaction with the computing resource, an intermediary device is utilized that acts as a coordinated computing device that is in networked communication with computing devices corresponding to each of the users, as well as the computing resource upon which the users are seeking to interact with.

The intermediary device is adapted to receive and transmit information both to the competing devices corresponding to each of the users as well as the computing resource, and to transform the information prior to transmission such that encapsulated data messages transformed to include specific personal or sensitive information can be generated. Similar to the multiplexer embodiment above, the intermediary device allows for segregation between the graphical user interface instances of each of the computing devices while performing transactions with the computing resource.

In a non-limiting example, each of the users, through their computing devices, connects with the intermediary device, which is also connected to the target computer resource. In the flight booking example, the target computing resource is a server that handles a website portal for the flight booking organization.

Each of the users is able to conduct a coordinated inquiry or transaction to purchase flight tickets, and where personal or transaction information is required, the intermediary device is able to combine the received personal or transaction information obtained separately from each of the computing devices of each user in providing payment transaction details to the flight booking organization.

The intermediary device, in some embodiments, also receives confirmation or other transaction information from the flight booking organization, and separates the information at the separate packets or data streams which are then transmitted individually to each of the computing devices separately such that data may not be visible across all graphical user interface instances.

In another aspect, the multiplexer or intermediary device is further adapted to establish a plurality of individual chat sessions with the target computing resource. Each of these individual chat sessions, for example, may be adapted to individualized questions or transaction information requests.

In another aspect, the multiplexer intermediary device is further adapted to support a group chat session, which may, in some embodiments, be in addition to the plurality of individual chat sessions.

In another aspect, the multiplexer or intermediary device is further adapted to determine whether there is sufficient information and/or transaction details to finalize or otherwise confirm a coordinated transaction.

In another aspect, the multiplexer or intermediary device is configured to control rendering of a graphical user interface where voting or other controls can be utilized to modify interactions with the target computing resource. For example, the voting can be used to make selections from options that are designated by a user or provided by the target computing resource. Voting can be based on a majority vote, a plurality vote, and in some embodiments, voting may be restricted to certain users with voting rights or super voting rights.

In another aspect, the multiplexer or intermediary device is configured to parse the received information from the computing devices of the users, or the target computing resource, and flag or identify the information is sensitive for a particular user or group of users. This identified or flagged information is then encapsulated otherwise adapted such that it is only provided (e.g., shown) to this particular user or group of users.

In another aspect, the multiplexer or intermediary device is provided as a computer server operating in a data center or other data processing facility. The computer server may, for example, be a special purpose machine which is transformed by the computer executable instructions residing there on, which when executed, cause a processor or one or more processors to execute methods as described in various embodiments herein.

The special purpose machine can be a networked computing device that is a computer server connected or otherwise coupled to a data message bus which coordinates messaging as between the computing devices of the users as well as a target computing resource. The computer server can be a rack-mounted server device that is a physical computing appliance residing within the data center.

While the example above was provided for booking a trip, various embodiments can be used for other types of purchases. Payment for the booking/purchase might also be split across some or all members of the group session, in accordance with settings the group has selected.

Corresponding methods, computer program products affixed in non-transitory computer readable media storing machine readable instructions for execution by a processor to perform the methods are contemplated. The group sessions can be implemented either designating a primary instance or multiple primary instances as multiplexer devices, or using a separate third party multiplexer device. As described in some embodiments, the group sessions can be implemented using encryption approaches using encryption keys local to each instance, or in another variation, using a trusted execution environment or multiple trusted execution environments having always protected databases by providing permissions in the form of corresponding links. The links provide for query permissions and capabilities of various devices such that varying levels of query information can be obtained based on a particular need of a group session party, as provided by each particular instance.

DESCRIPTION OF THE FIGURES

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures.

DETAILED DESCRIPTION

Systems, methods, and computer readable media are directed in various embodiments for providing multiuser sessions for coordinated electronic transactions.

A technical solution is directed to coordinating the electronic transactions across a plurality of instances, where the underlying users of the instances can include at least two users. The technical solution is adapted for improved collaboration while maintaining a level of technical segregation between the instances such that confidential or sensitive information is not shared at between instances. Segregation can also, as described in variations below, be established such that even a multiplexing device is not able to observe or obtain full access to the confidential or sensitive information.

The collaboration can include, for example, establishing annotations visible to the group on a user interface, discussing via a group chat, among others. However, individualized communications to/from a multiplexer or intermediary device are utilized to segregate confidential and/or sensitive information, such as personal or transaction information. Accordingly, multiple individuals are able to enter into transactions together (e.g., booking a trip package after viewing candidate packages).

Additional privacy enhancing mechanisms are utilized to coordinate sensitive data flow to conduct the transaction at the target computing device. Sensitive information can include passport information, credit card details, social security numbers, driver's license information, among others.

Figure 1:
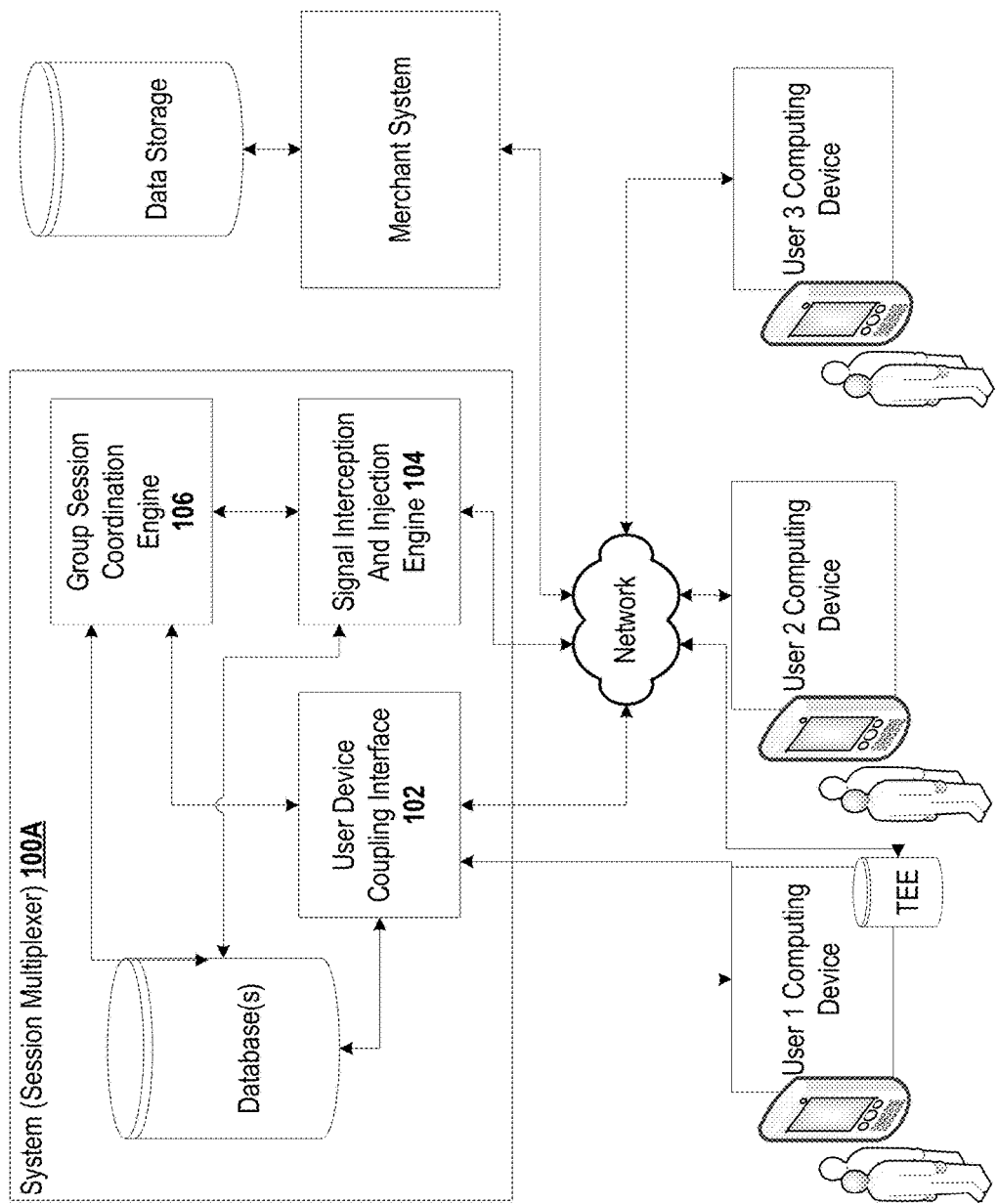
FIG. 1 is a block schematic diagram of a system that includes a multiplexer device that is configured to broadcast or otherwise makes available a first user's session from a graphical user interface to other users, according to some embodiments.

FIG. 1 is a block schematic diagram of a system that includes a multiplexer device that is configured to broadcast or otherwise makes available a first user's session from a graphical user interface to other users, according to some embodiments.

In this embodiment, the first user's graphical user interface session is responsible for actual access to a particular computer resource, such as a merchant's website. The system 100A is a multiplexer device is adapted for interoperation between the first user's computing device and the computing resource upon which the first user's computing device is interacting with.

The multiplexer device intercepts data packets either uni-directionally or bi-directionally such that certain aspects can be transformed and shared across a network to the other users. In some embodiments, the multiplexer device is adapted to remove certain confidential information from the packets prior to delivery.

The system 100A includes a user device coupling interface 102 that is configured for communications with the computing devices corresponding to each of the one or more users, the user device coupling interface 102 transmitting graphical user interface control instructions to control rendering of graphical user interface elements including interactive graphical user interface elements to be rendered on displays couple to the user computing devices.

The system 100A includes a signal interception and injection engine 104 which is configured as a tool that can be coupled, according to various alternate embodiments, at different locations along the medications pathway. For example in the first embodiment, the signal interception and injection engine 104 can be coupled to the primary user's computing device. In a second embodiment, the signal interception and injection engine 104 can be coupled to the target computing resource. In a third embodiment, the signal interception and injection tool 104 can be coupled to a networking pathway between the primary user's computing device and the target computing resource.

The signal interception and injection engine 104, in some embodiments, is a passive bypass interception engine that reads signals being transmitted does not add additional signals or modified signals. In another embodiment, the signal interception and injection engine 104 is an active interception engine that transforms or otherwise injects data packets that are either provided to the computing devices of the users or to the target computing resource. The signal interception and injection engine 104 can be configured to monitor, for example, through parsing received webpage rendering data or other messages from the target computing resource, web 'hooks' that are designed to trigger the operation of the group session system 100A.

The operation can include state transitions between different states, such as a first group selection state indicating particular shared characteristics of a transaction (e.g., airline tickets on the same date, arriving at the same city), non-shared characteristics (e.g., can depart from different cities), group transaction success criteria (e.g., 4/10 purchasers must consummate either no transaction should occur), and a second individual instance operation state where individual instances provide or provide access to sensitive or confidential information individually. In some embodiments, additional states or transitions are possible, for example, an optional third group operation state where the individual instances have either finished their transactions or time has elapsed, and the individual instances are returned to a group session where certain information can be made available (e.g., 5/10 purchasers have consummated the transaction, therefore the transaction is proceeding).

In the individual instance operation state, different variations are possible in terms of how information is provided to a multiplexer device or the target computing resource. In a first variation, the information is collated together either in the form of protected information or protected links to the multiplexer device, which then transmits a consolidated message when transaction conditions are met. In a second variation, information instead is provided in the form of access or messages directly to the target computing resource from each of the individual instances. In some embodiments, depending on the operation state, different capabilities of the target computing resources can be made available. For example, during the first state, a chatbot may provide guidance to the group as a whole, for example, answering questions such as "what's the weather in the target city", and in the second state, the chatbot provides individual guidance instead and the responses may not be made available to other instances (e.g., "do I have priority boarding").

Accordingly, the use of system 100A allows the avoidance of transmitting sensitive or confidential and personal information or transaction information as between the users themselves. Where an active interception engine is provided, a secure communications pathway may be established separate from the communication pathway being used by the first user's computing device. The secure communications pathway can be established between the signal interception and injection engine 104 and the target computing resource such that secure and private information can be transmitted along this pathway.

The system 100A includes a group session coordination engine 106, which is configured to coordinate one or more activities taking place in a transaction instance being hosted by the target computing resource, and driven by the primary user's computing device. The group session coordination engine 106, responsive to received information or requests for information from target computing resource, relays user specific information to corresponding user computing devices, and in some embodiments, also requests user specific information from the corresponding user computing devices.

The group session coordination engine 106 operates in concert with the signal interception and injection engine 104 and encapsulating data packets in the form of data structures that include consolidated user information or transaction information.

The multiplexer device intercepts packets from the computing resource indicative of a request for a transaction and modify such packets prior to broadcast to the other users such that a coordinated transaction may occur as between the users. The multiplexer device, and some embodiments, receives and coordinates data packets that are received from the computing devices of the users, for example, representing one or more partial payments or delivery of personal information to the computing resource. The multiplexer device then transforms or otherwise generates or encapsulates a coordinated transaction package of data elements that can be provided to the computing resource.

In a non-limiting simplified example, three users may be seeking to purchase flight tickets for a trip together. The three users designate one of the users as a primary, otherwise known as the first user. The first user then utilizes his or her computing device to establish a multiuser session whereby an instance of the multiplexer system 100A is provisioned and connected.

In the multiuser session, the first user provides inputs and drives the purchase flow through the computing resource of the flight ticket retailer, which may include computer servers, or other devices, hosting the website portal.

In some embodiments, the multiplexer system 100A includes a trusted execution environment stored thereon or electronically coupled to the multiplexer system 100A that is configured for automatically enforcing policies using segregated (e.g., isolated) computing environments and components.

In some embodiments, the trusted execution environment is operated by a trusted institution, such as a financial institution, maintaining and automatically enforcing privacy and security permissions for the users or other entities in the form of an always protected data warehouse. The always protected data warehouse loads tables for query analysis, runs the queries, and then unloads the tables, and third parties are not able to access the underlying data or run queries directly without sending the queries through the always protected data warehouse. Custom, role-based, or default privacy permissions can be automatically enforced in respect of either query structuring or query responses, or both. In some embodiments, only pre-approved query types are permissible.

When sensitive information is requested from computing devices of other users, a separate communications channel may be established between the trusted execution environment and the computing devices to request the provisioning of sensitive information. Sensitive information can be input manually (e.g., through input boxes), or upon verification of the user's intent, can be automatically provisioned by the computing device corresponding to the owner of the sensitive information. Accordingly, in this embodiment, the sessions are interconnected to coordinate data transfer, and improved privacy management mechanisms can be automatically enforced to enhance privacy of information designated as private. The privacy of information can be memorialized and established through the imposition of encryption during the data loading stage such that any data sets are encrypted using an encryption key associated with the user whose privacy is sought to be maintained.

The trusted execution environment is configured for limited interactions with external computing devices such that any query request or data message request is automatically processed in accordance by a data custodian daemon process that is configured to reject the request automatically if the query request requires provisioning of sensitive information in violation of the polices being enforced. In some embodiments, permissions can be established through the sending of cryptographic approvals or certificates, which, for example, enable the data custodian daemon process to generate outputs using the sensitive information directly.

The trusted execution environment operates an always-protected database, and access is permitted only when corresponding permissions are established by the data owner (e.g., each individual instance owner).

As described in some variations, instead of providing information directly in the form of encapsulated data packets, the individual instances can also instead establish permissions in the trusted execution environment and provide permission links (e.g., in the form of access tokens) to the multiplexing device and/or the target computing resource, such that each of these devices or resources are able to couple with the trusted execution environment to run queries in obtaining various information elements used to conduct a transaction or to show relevant information thereof.

Where private information is required for the ultimate encapsulated data packet to be sent to the target computing resource, each of the computing devices can provide permissions, for example, by sending a corresponding access token or cryptographically signed message, and the ultimate encapsulated data packet can be provisioned with the sensitive information, and either sent directly to the target computing resource, or in some embodiments, an encrypted packet is generated using, for example, a public key of the target computing resource, and provided back to the multiplexer system 100A to be sent to the target computing resource, which is able to decrypt the packet using a corresponding private key to the public key.

For example, the trusted execution environment may have an established user profile for the user associated a corresponding instance. The user profile controls access to data fields and/or data tables on a corresponding always-protected database table, and the access can be controlled in the form of the types of queries that can be run and/or query responses that can be obtained using such information when the database table is loaded into the trusted execution environment. Differing levels of access control can be established either by default or customized based on consent and privacy permissions, and automatically enforced by the daemon process.

When the individual instance is utilized to provide access to a particular sensitive data field or value, the individual instance provides an access token that can include as a field, a particular identifier of the device or resource that is given access. In the access token, the level of access can be established as well. For example, the individual instance, in the context of a purchasing transaction, can give detailed access to the target computing resource to obtain a credit card number and a precise address and post code. On the other hand, the group session operating instance, such as the multiplexer, may be provided access at a lower level of access permissions, such as being able to access a post code field in a query, or in some embodiments, only being able to send in queries that yield imprecise query responses (such as counting query responses, or query responses indicating a proximity-based response as opposed to a precise address).

The multiplexer system 100A in this embodiment intercepts, using signal interception and injection engine 104, the signals being provided to the website portal or returning from the website portal and transforms the signals as data packets for broadcasting to each computing device corresponding to each of the three users.

The data packets are transformed by the group session coordination engine 106 such that each of the users is able to independently provide his or her personal or transaction information, and receive confirmations and other data from the website portal that are relevant to them, and in some embodiments, the multiuser session of the group session coordination engine 106 establishes a data wall at between each of the three users such that confidential or sensitive information is not shared beyond the multiplexer device.

Accordingly, the multiplexer system 100A transforms the received data packets and modifies the graphical user interface renderings to enable a coordinated transaction where information is segregated as between the different users. Each user through the multiplexer system 100A is able to pay separately and provide information separately to the website portal, and some embodiments, separate confirmations are received.

Figure 2:
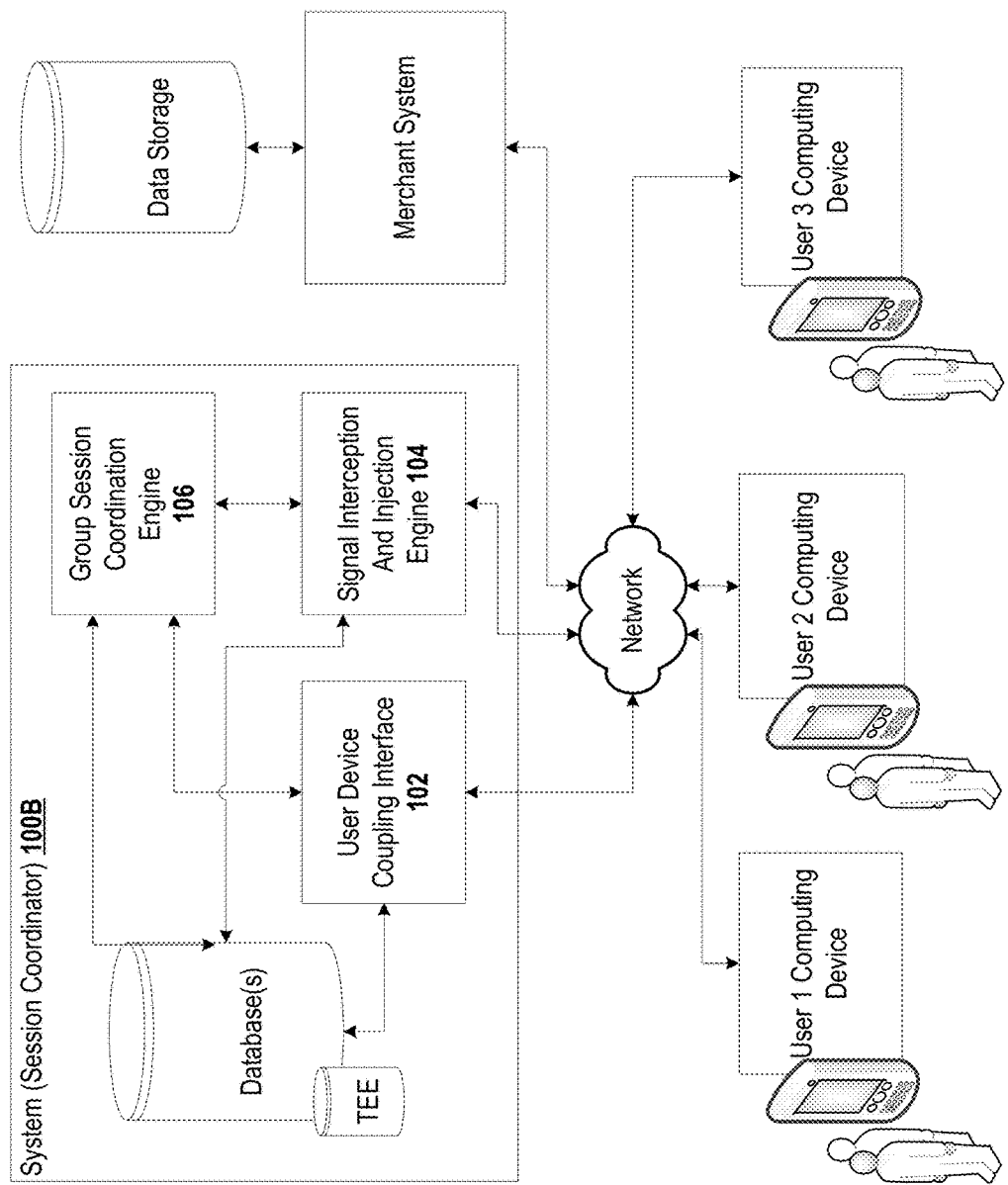
FIG. 2 is a block schematic diagram of a system that includes an intermediary device that is configured to coordinate a group session as a device that operates between a number of user computing devices and a target computing resource, according to some embodiments.

FIG. 2 is a block schematic diagram of a system that includes an intermediary device that is configured to coordinate a group session as a device that operates between a number of user computing devices and a target computing resource, according to some embodiments.

In this variant embodiment, rather than having a first user whose computing device drives the interaction with the computing resource in accordance with FIG. 1A, an intermediary system 100B is utilized that acts as a coordinated computing device that is in networked communication with computing devices corresponding to each of the users, as well as the computing resource upon which the users are seeking to interact with.

Similar to the example of FIG. 1A, intermediary system 100B includes the user device coupling interface 102 that is configured for communications with the computing devices corresponding to each of the one or more users, the user device coupling interface 102 transmitting graphical user interface control instructions to control rendering of graphical user interface elements including interactive graphical user interface elements.

A target computing resource coupling interface 104A is utilized to coordinate communications with the target computing resource. Similarly, a group session coordination engine 106 is provided that is configured to coordinate one or more activities taking place in a transaction instance being hosted by the target computing resource, and driven by the primary user's computing device. The group session coordination engine 106, responsive to received information or requests for information from target computing resource, relays user specific information to corresponding user computing devices, and in some embodiments, also requests user specific information from the corresponding user computing devices.

The intermediary system 1008 is adapted to receive and transmit information both to the competing devices corresponding to each of the users as well as the computing resource, and to transform the information prior to transmission such that encapsulated data messages transformed to include specific personal or sensitive information can be generated. In a non-limiting example, each of the users, through their computing devices, connects with the intermediary device, which is also connected to the target computer resource. In the flight booking example, the target computing resource is a server that handles a website portal for the flight booking organization.

Similar to the multiplexer embodiment above, the intermediary device allows for segregation between the graphical user interface instances of each of the computing devices while performing transactions with the computing resource.

Each of the users is able to conduct a coordinated inquiry or transaction to purchase flight tickets, and where personal or transaction information is required, the intermediary device is able to combine the received personal or transaction information obtained separately from each of the computing devices of each user in providing payment transaction details to the flight booking organization.

The intermediary system 1008, in some embodiments, also receives confirmation or other transaction information from the flight booking organization, and separates the information at the separate packets or data streams which are then transmitted individually to each of the computing devices separately such that data may not be visible across all graphical user interface instances.

The multiplexer system 100A or intermediary system 1008 can be configured to control rendering of a graphical user interface where voting or other controls can be utilized to modify interactions with the target computing resource, through the group session coordination engine 106. For example, the voting can be used to make selections from options that are designated by a user or provided by the target computing resource. Voting can be based on a majority vote, a plurality vote, and in some embodiments, voting may be restricted to certain users with voting rights or super voting rights. Voting can be used during the group selection state, for example, so that users can vote on different aspects of the shared transaction, for example, a weekend or a set of dates for travel, etc.

The multiplexer system 100A or intermediary system 1008 can be configured to establish a plurality of individual chat sessions with the target computing resource. The group session coordination engine 106, in some embodiments, is configured to provision separate communication pathways for each of the individual chat sessions such that they are segregated as between users or subgroups of users.

Each of these individual chat sessions, for example, may be adapted to individualized questions or transaction information requests. The multiplexer system 100A or intermediary system 1008 can be further adapted to support a group chat session, which may, in some embodiments, be in addition to the plurality of individual chat sessions.

The multiplexer system 100A or intermediary system 1008 can be further adapted to determine whether there is sufficient information and/or transaction details to finalize or otherwise confirm a coordinated transaction.

The multiplexer system 100A or intermediary system 1008 can be configured to parse the received information from the computing devices of the users, or the target computing resource, and flag or identify the information is sensitive for a particular user or group of users. This identified or flagged information is then encapsulated otherwise adapted such that it is only provided (e.g., shown) to this particular user or group of users.

In this embodiment, the intermediary system 1008 may provide a trusted execution environment which is shared between each of the different computing devices for each of the individual sessions of the group chat session. Similar to the above example in respect of FIG. 1A, the trusted execution environment may be a segregated or computationally isolated processor and coupled memory/non-transitory computer readable medium where interactions with external computing components is extremely limited in accordance with an automatically enforced data custodian daemon. In this example, the trusted execution environment receives sensitive information through a secure communication channel established for each session, and similarly, the data is loaded into the trusted execution environment or a coupled high security storage device to adapted to improve and automatically establish privacy enhancements.

The interconnected sessions then transmit sensitive information to the trusted execution environment, and the message ultimately being provided to the target computing device can be encapsulated with the secure environment stored as data values, but the sensitive information itself is not accessible by any of the external computing devices associated with users where it did not originate from.

Figure 3A:
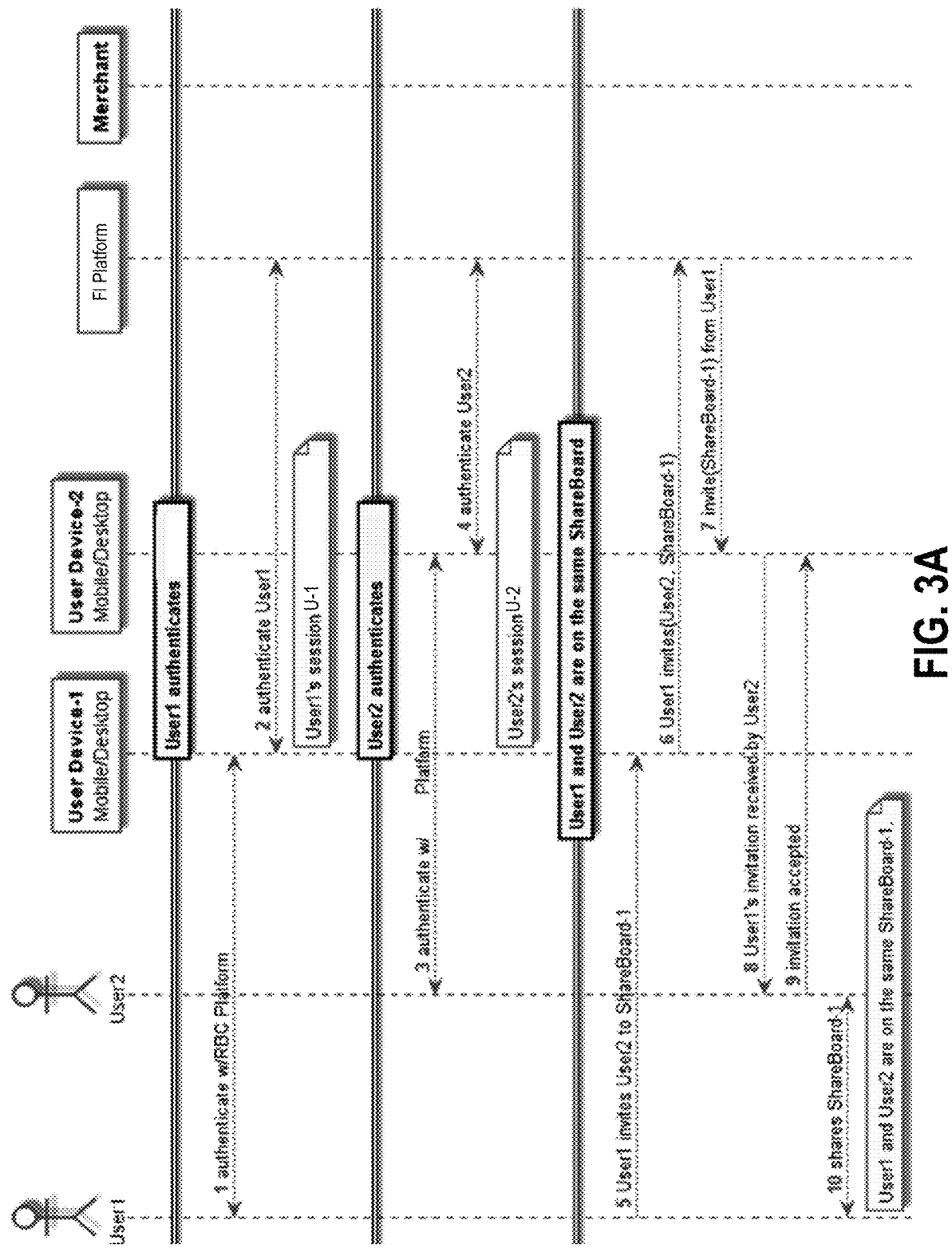
FIG. 3A, 3B is an example method diagram showing an example process for provisioning a group session instance, according to some embodiments.
Figure 3B:
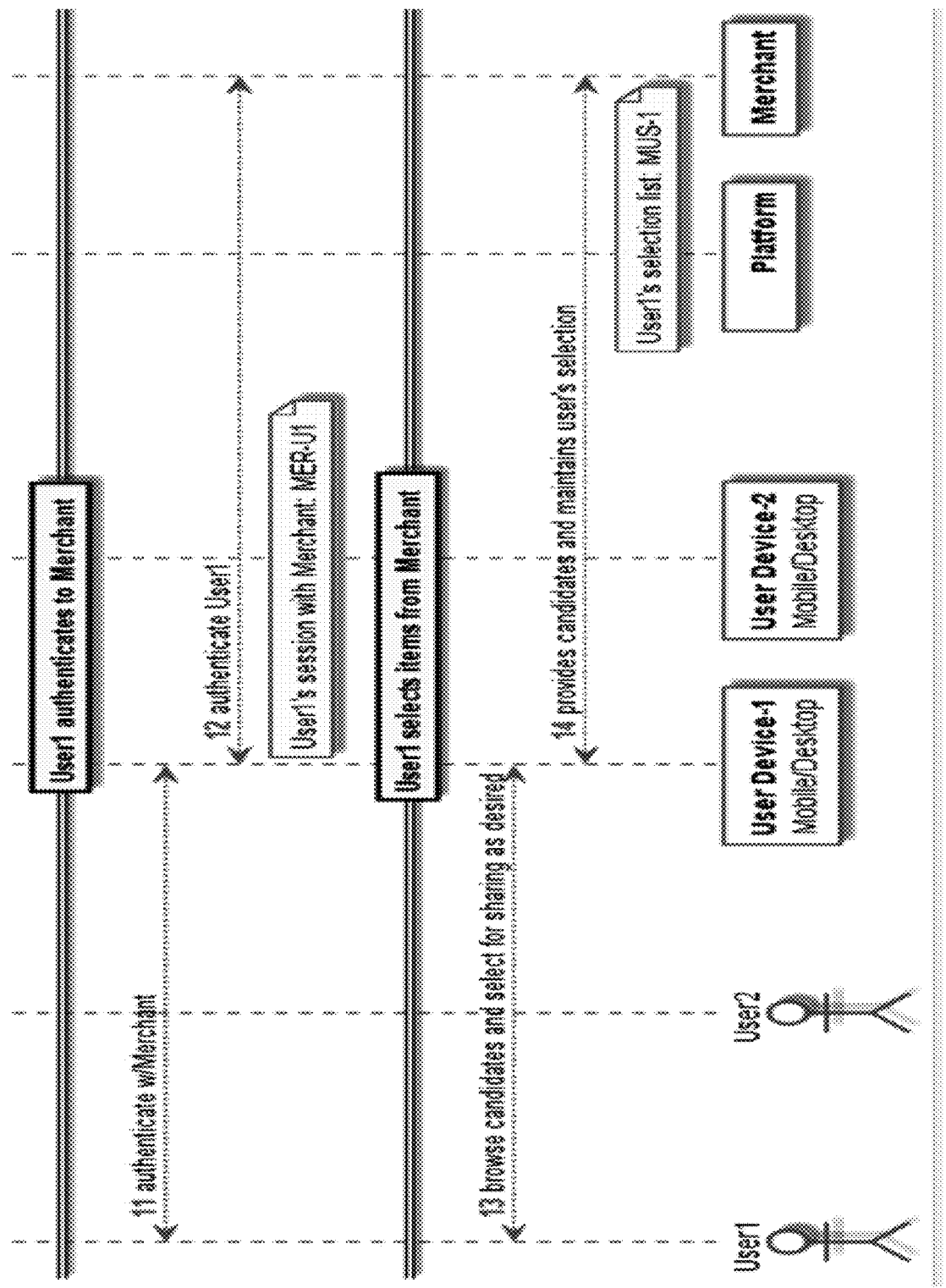

FIG. 3A and FIG. 3B is an example method diagram showing an example process for provisioning a group session instance, according to some embodiments. FIG. 3A extends into FIG. 3B.

A challenge with other approaches to group sessions is that the privacy of user information is often not maintained as users enter information into fields or in responses to chat session messages. The other users may be able to observe, for example, credit card information, addresses, social security information, travel identification numbers, etc. This issue becomes increasingly challenging when there are a large number of users who may not trust one another (e.g., where an entire classroom of students is trying to book and coordinate a field trip through an online portal).

The group sessions are useful in situations where the coordinate purchasing is useful—for example, where there are limited tickets, where the individuals seek to sit close to one another, where there are greater incentives for group purchasing using volume discounts or economies of scale, among others. Group sessions can be used for applying for accounts or services jointly (e.g., a mortgage on an investment property between five friends).

In this example, Tom and John are planning a trip together. Tom does some research for potential trip packages, and wants to share candidate trip packages with John and further discuss. Tom and John are viewing candidate packages, and making annotations as discussion goes on. A trip package is selected and Tom and John are able to book the trip package together.

Tom is designated as User 1 and John is designated as User 2. FIG. 3A and FIG. 3B shows an illustrative method whereby both the User 1 and 2 first authenticate using their corresponding devices to an authentication platform, such as a trusted financial institution platform. Users 1 and 2 then are considered to be sharing the same "ShareBoard", which is a group session where Users 1 and 2 are able to coordinate in conducting a purchase or a transaction together through an online portal. In some embodiments, the users may invite one another to the platform—e.g., one user may invite another to join the group session.

The group session, for example, may be instantiated as a shared web browser session where the two parties are able to navigate elements together, or, in another embodiment, a shared computer-based chat session, for example, with a chat bot that is configured to engage both users simultaneously and separately (e.g., to obtain private information). Example uses of group sessions include mortgage applications, travel planning, etc.

In this example, User 1 authenticates the group session with a merchant through, for example, a merchant computing device or computer server that provides an interface whereby payments can be conducted to obtain goods or services. After the account is validated at the merchant computing device, the merchant computing device can automatically provision a merchant identifier (in this case, MER-U1) for the group shopping session (e.g., associated or tied to a shopping cart, identified as MUS-1). In this example, both of Users 1 and 2 are able to brose offerings together and to create selection lists of items to buy, and to buy them. Where sensitive information is required from either of the two parties, the system may be configured to provide a targeted chat bot experience where the users, through a breakout conversation, are able to provide the private information securely to the processing engine, which in this case, could be payment details, sensitive identifying information, among others.

Figure 4A:
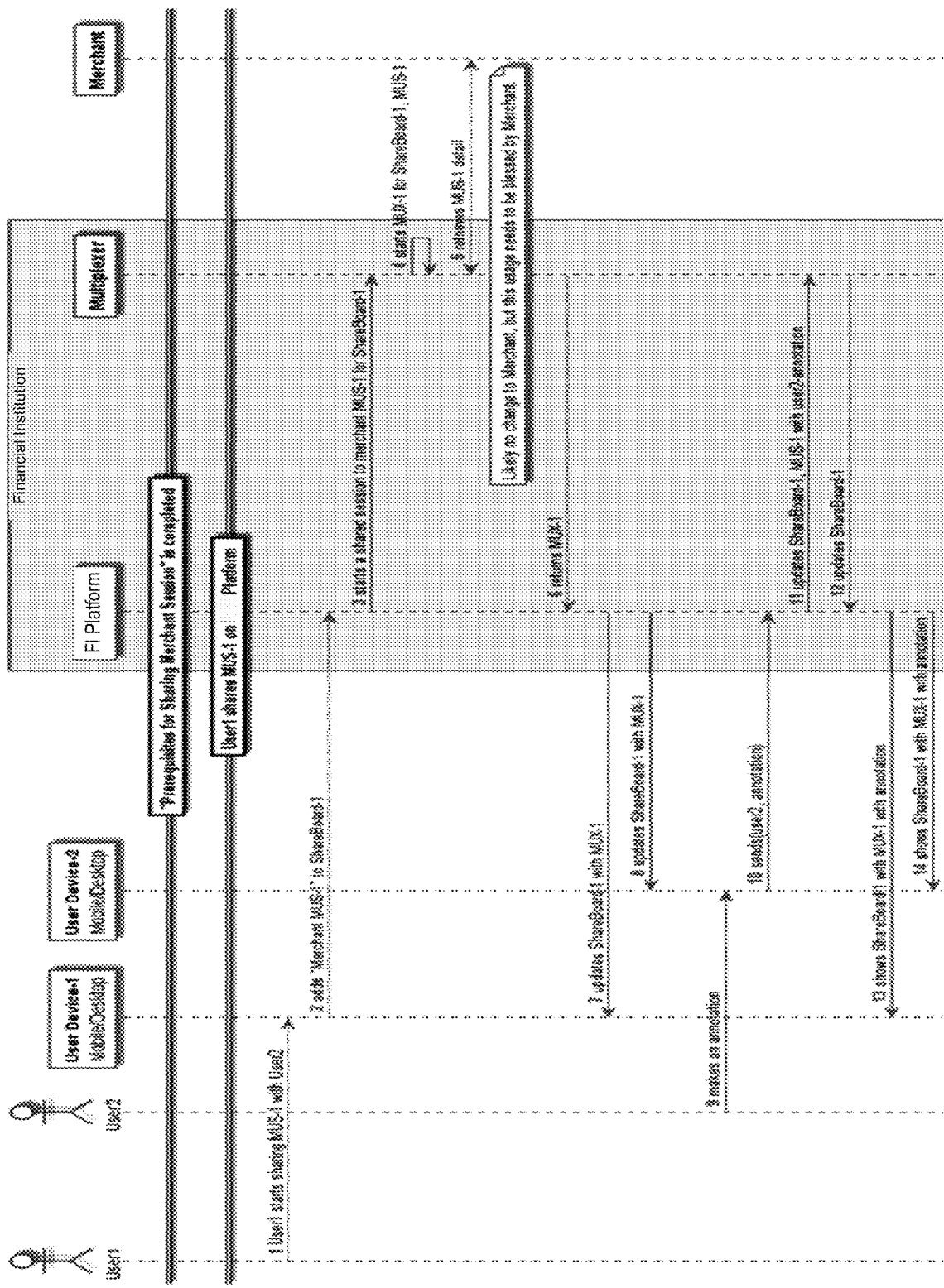
FIG. 4A, 4B is an example method diagram showing an example process for provisioning a group session instance using a multiplexer system, according to some embodiments.
Figure 4B:
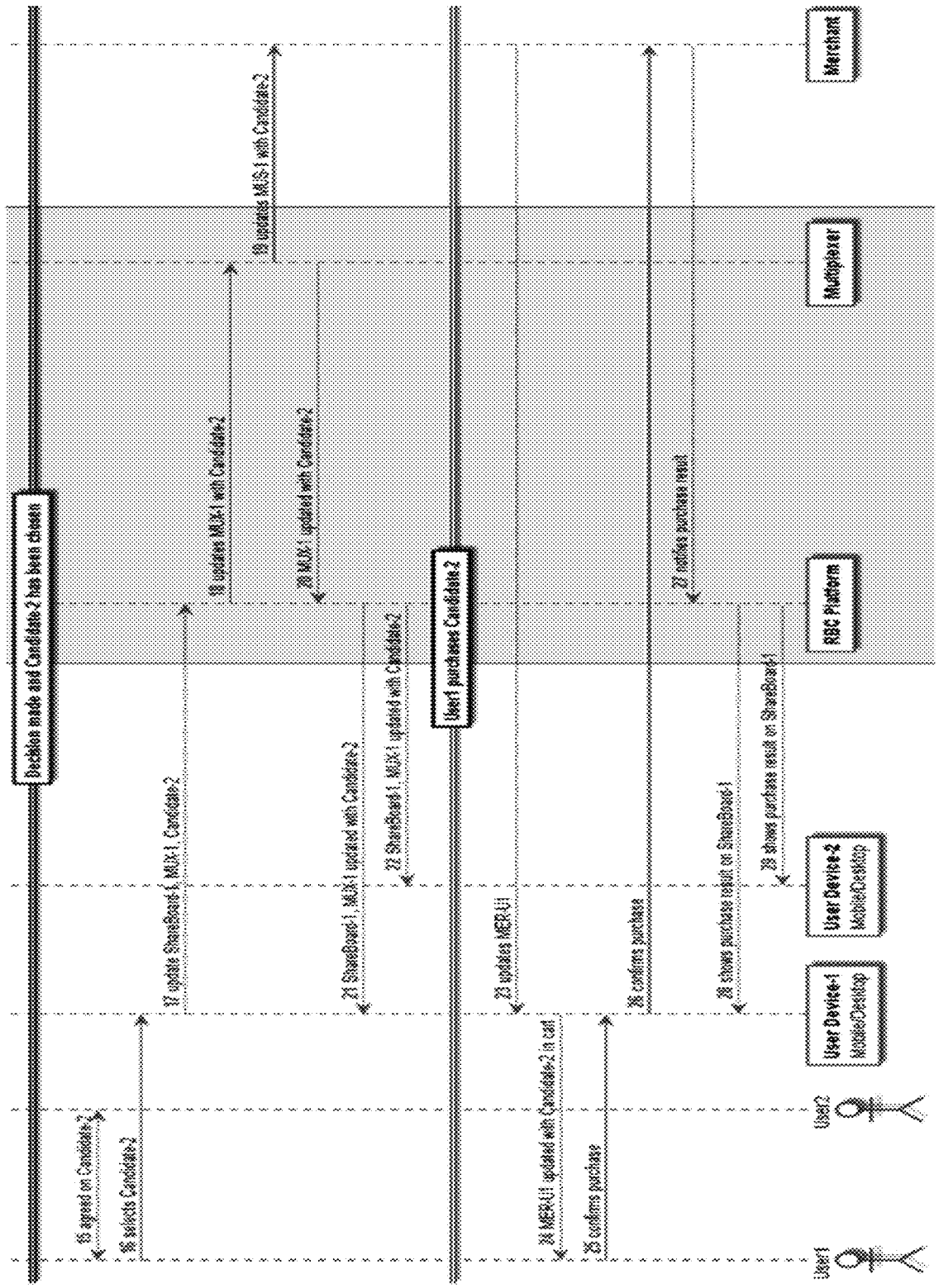

FIG. 4A and FIG. 4B is an example method diagram showing an example process for provisioning a group session instance using a multiplexer system, according to some embodiments. FIG. 4A extends into FIG. 4B.

In this example, the multiplexer system can be provided by a trusted computing device at a trusted partner, such as a financial institution. In this example, User 1 begins sharing the session MUS-1 with User 2, and User 1's device initiates the session by adding MUS-1 to the group session coordinator process, Share-Board-1. An instance of a group session is established under MUS-1, and the multiplexer instance MUX-1 is instantiated, retrieving detail for the selected items from MUS-1 from the merchant, and MUS-1 is also updated with both the User 1 and User 2's credentials. A number of initial candidate selections are populated corresponding, for example, to available products or services from the merchant.

MUX-1 returns the retrieved selections to the platform, which can then render a corresponding visual data object on a display of the group session on User 1's device. Both User 1 and User 2 are able to make annotations through changing or modifying or otherwise providing inputs to the group session being shared, such as providing inputs for the selection of one of the candidate selections.

When a decision has been made and a candidate has been chosen, in this example, candidate-2, corresponding authorization messages are sent from the User 1 and User 2 devices to the trusted financial institution computing system. The information is aggregated either by the trusted financial institution computing system or the merchant computing systems, and the candidate is finalized and a selection is either forwarded or processed by the merchant computing systems.

The merchant computing systems return confirmation messages to the group session instance, and the User 1 is prompted to initiate a purchase of the selected candidate-2 in this example (e.g., a shopping cart can be updated having only candidate-2 in the group session instance). In this example, User 1 then confirms the purchase to trusted financial institution computing system which causes the completion of the check out process with the merchant computing systems, and the purchase confirmation and results are shared with the users through updating of the group session.

In some embodiments, the annotation process and selection process requires the provisioning of sensitive information, such as payment details or identifying information. In these instances, the multiplexer device is configured to establish a secure communication channel with each of Users 1 and 2, and in further embodiments, couple the channels with a trusted execution environment directly such that information is provided directly into the trusted execution environment from each of the users. The information can be securely loaded using cryptographic mechanisms to enhance privacy and when the multiplexer is providing the ultimate confirmation message to the merchant (e.g., the target computing resource), the sensitive information can be securely encapsulated for delivery.

Figure 5A:
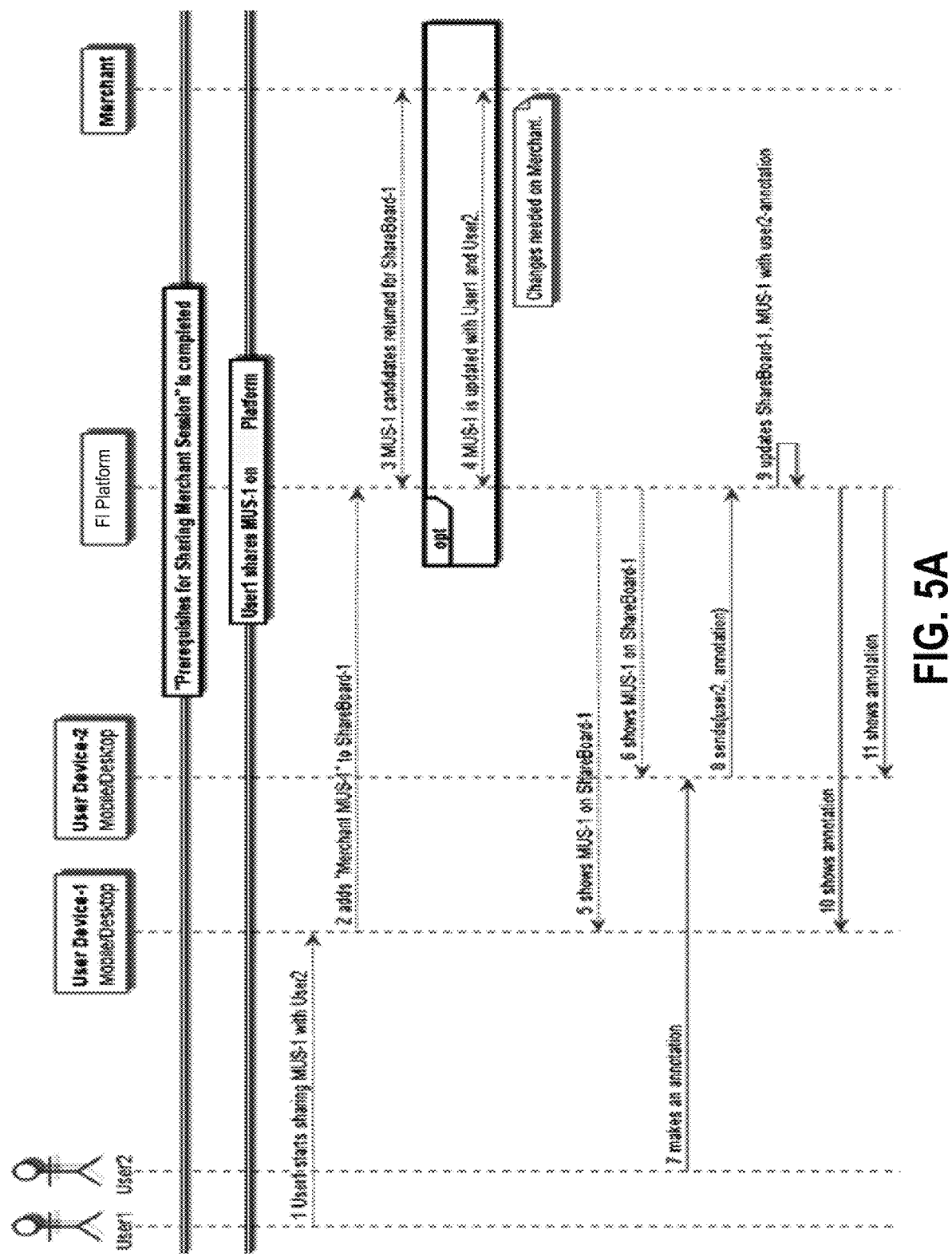
FIG. 5A, 5B is an example method diagram showing an example process for provisioning a group session instance using an intermediary system, according to some embodiments.
Figure 5B:
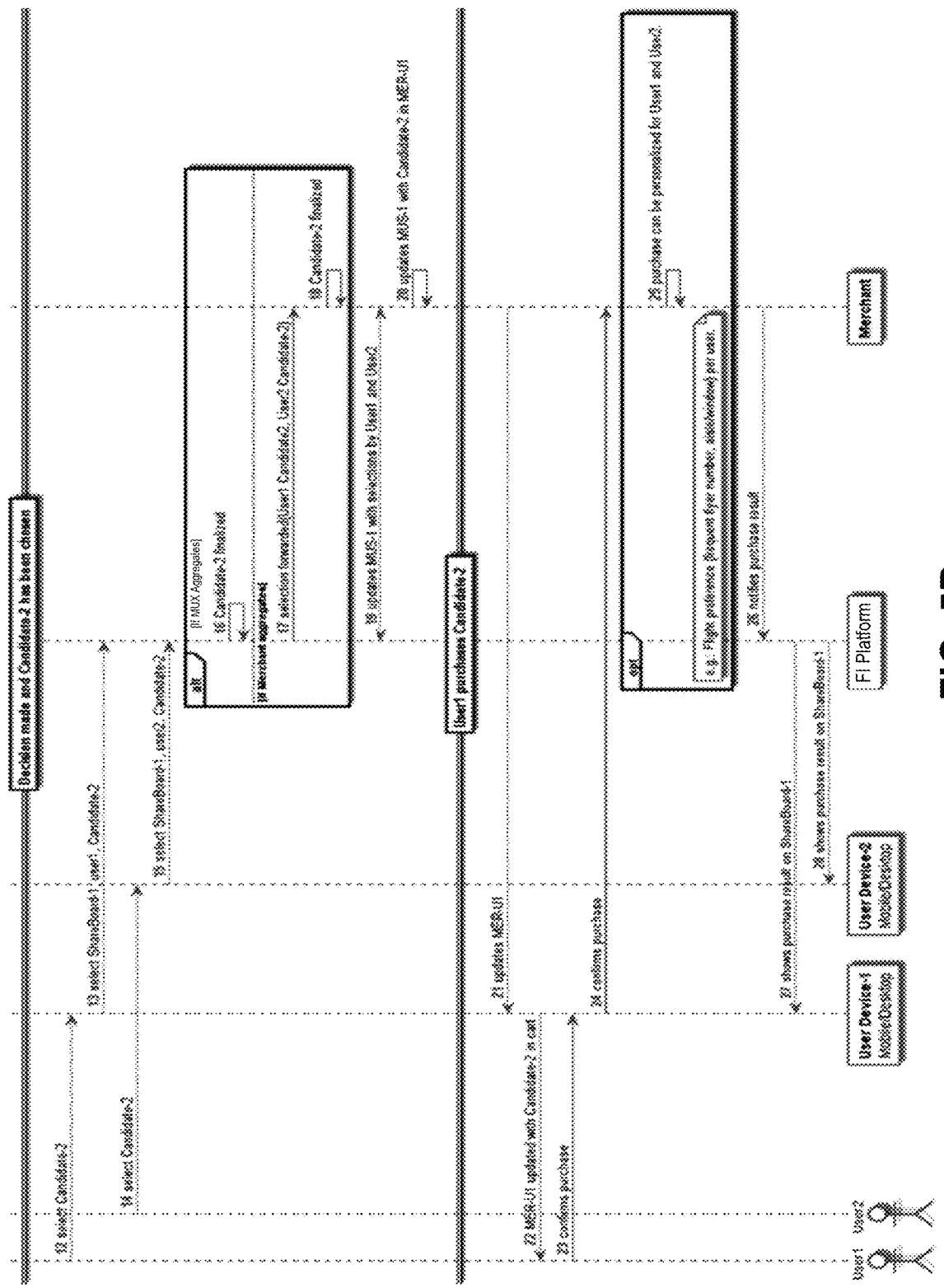

FIG. 5A and FIG. 5B is an example method diagram showing an example process for provisioning a group session instance using an intermediary system, according to some embodiments. FIG. 5A extends into FIG. 5B.

In this example, instead of using a multiplexer to multiplex User 1's session, the session (MUS-1) is instead conducted simultaneously on a centralized system that is decoupled from User 1 and User 2's devices, but coupled for interaction thereon through the rendering of corresponding display screens or visual interface elements, such as a webpage or a chat screen. Similar to FIG. 4A and FIG. 4B, the User 1 and User 2 are able to utilize annotation data messages to select a candidate selection for aggregation by the trusted financial institution computing system such that a purchase transaction can be utilized for Candidate-2.

In some embodiments, the annotation process and selection process requires the provisioning of sensitive information, such as payment details or identifying information. In these instances, the multiplexer device is configured to establish a secure communication channel with each of Users 1 and 2, and in further embodiments, couple the channels with a trusted execution environment directly such that information is provided directly into the trusted execution environment from each of the users. The information can be securely loaded using cryptographic mechanisms to enhance privacy and when the multiplexer is providing the ultimate confirmation message to the merchant (e.g., the target computing resource), the sensitive information can be securely encapsulated for delivery.

Figure 6:
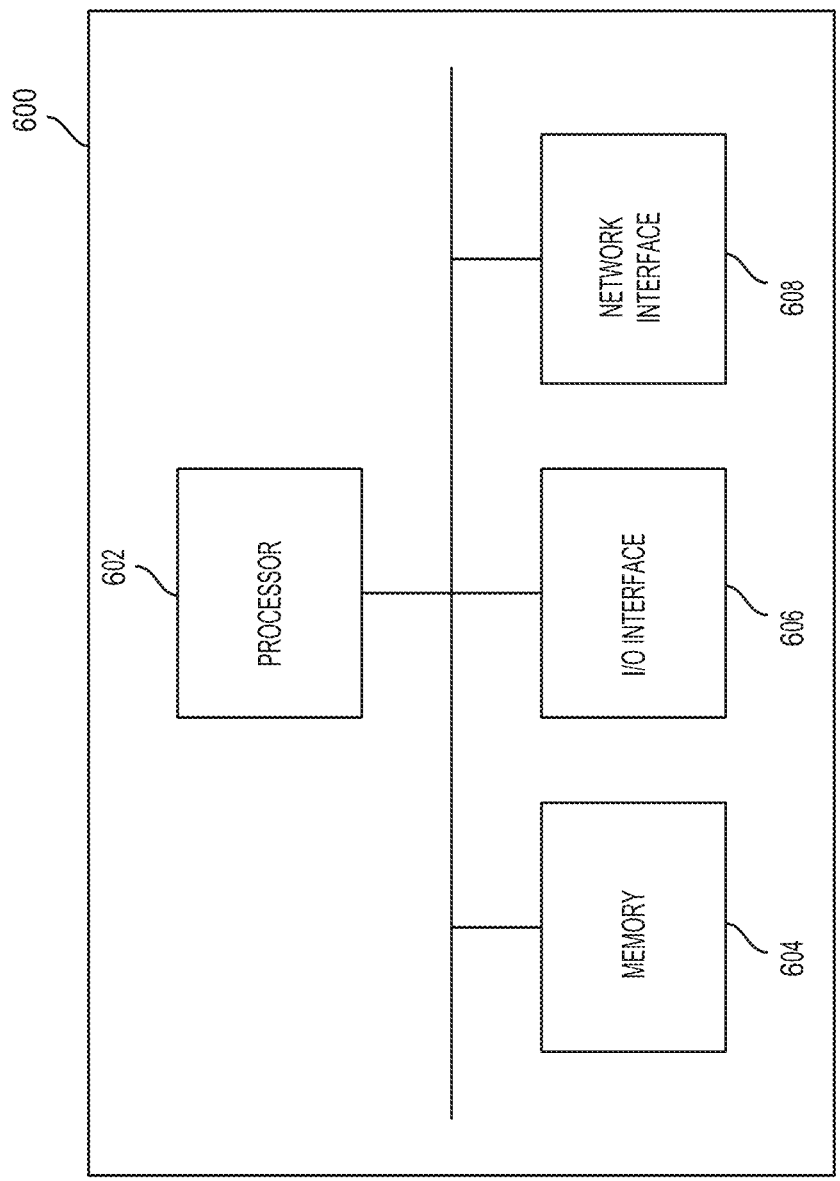
FIG. 6 is a schematic diagram of a computing device such as a server, which in some embodiments, may be a special purpose machine that is specifically configured for generating user representations, having, for example, specialized hardware components and/or software components.

FIG. 6 is a schematic diagram of a computing device 600 such as a server, which in some embodiments, may be a special purpose machine that is specifically configured for generating group sessions, having, for example, specialized hardware components and/or software components.

As depicted, the computing device includes at least one processor 602, memory 604, at least one I/O interface 606, and at least one network interface 608.

Processor 602 may be an Intel or AMD x86 or x64, PowerPC, ARM processor, or the like. Memory 604 may include a combination of computer memory that is located either internally or externally such as, for example, random-access memory (RAM), read-only memory (ROM), compact disc read-only memory (CDROM).

Each I/O interface 606 enables computing device 600 to interconnect with one or more input devices, such as a keyboard, mouse, camera, touch screen and a microphone, or with one or more output devices such as a display screen and a speaker.

Each network interface 608 enables computing device 600 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. Wi-Fi, WiMAX), SS7 signaling network, fixed line, local area network, wide area network, and others.

Figure 7:
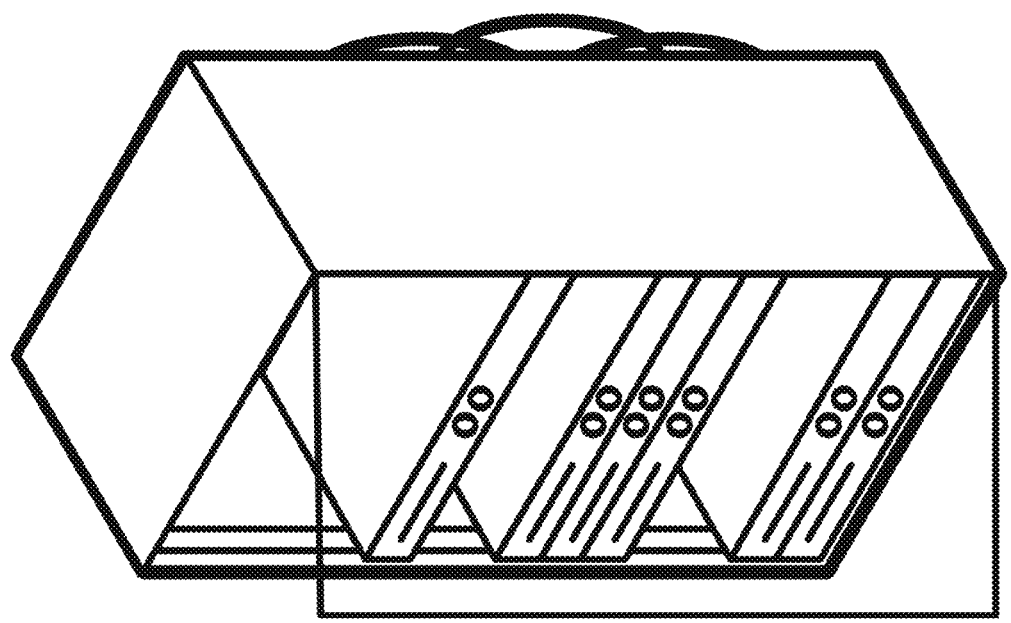
FIG. 7 is an example computer server that is a special purpose machine that is specifically configured for establishing and coordinating group session instances, according to some embodiments.

FIG. 7 is an example computer server 702 that is a special purpose machine that is specifically configured for establishing and coordinating group session instances, according to some embodiments.

The example computer server is provided as a computer server operating in a data center or other data processing facility. The computer server may, for example, be a special purpose machine which is transformed by the computer executable instructions residing there on, which when executed, cause a processor or one or more processors to execute methods as described in various embodiments herein.

The special purpose machine can be a networked computing device that is a computer server connected or otherwise coupled to a data message bus which coordinates messaging as between the computing devices of the users as well as a target computing resource. The computer server can be a rack-mounted server device that is a physical computing appliance residing within the data center. For example, the server device could be implemented at a financial institution trusted by all parties that is used to control the multiplexing.

Figure 8:
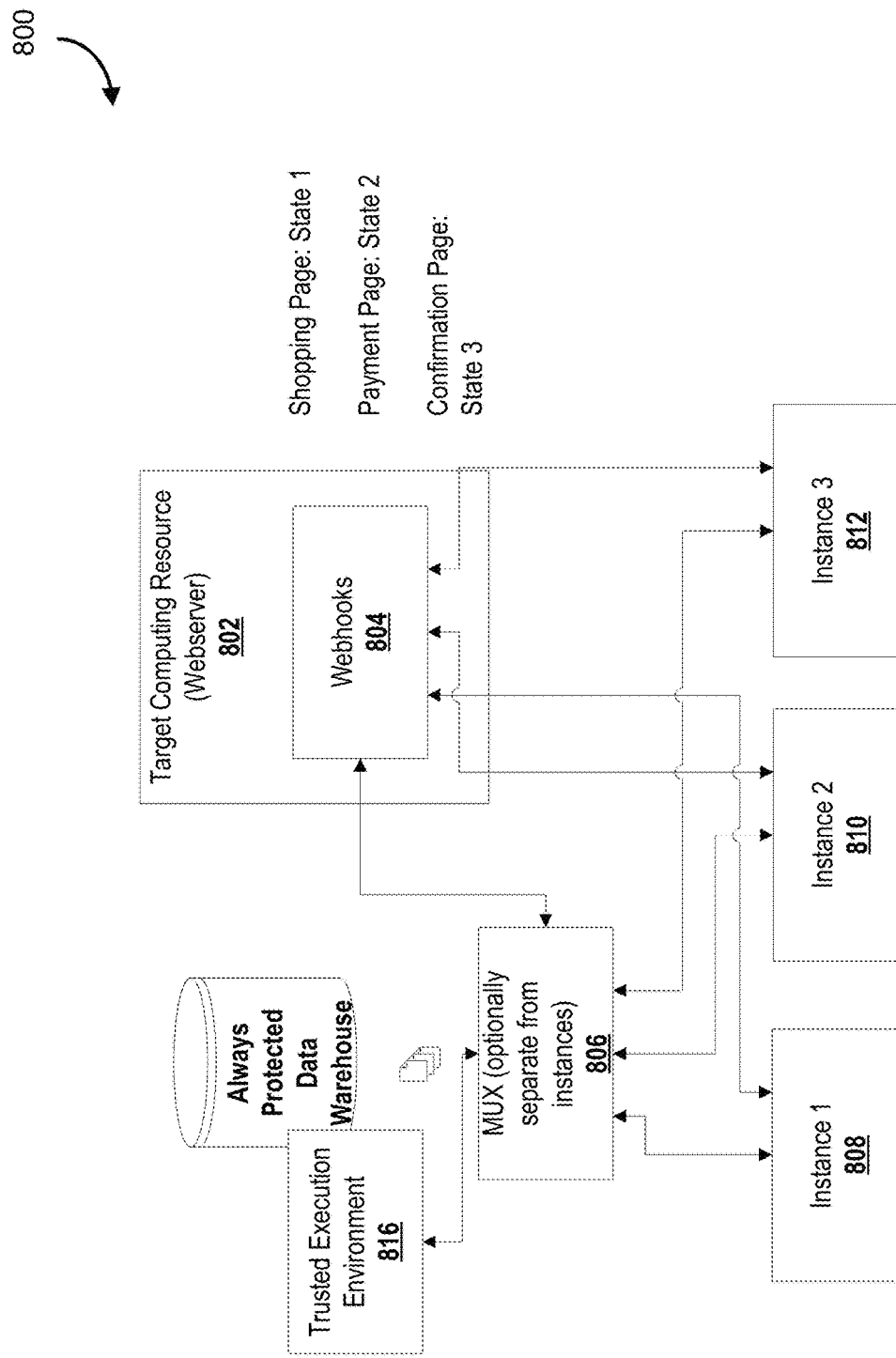
FIG. 8 is an example architecture diagram showing an example implementation, according to some embodiments.

FIG. 8 is an example architecture diagram showing an example implementation, according to some embodiments. A non-limiting example implementation is described in respect of FIG. 8. In the architecture diagram 800, the system is provided as a physical computing system where a number of devices are interoperating together to support a coordinated purchase of flights for a vacation. There are three users associated with different instances, instance 1-3, 808, 810, 812, respectively. Each of the instances 808, 810, 812, for example, are being run on different portable devices (e.g., smartphones) of each user, such as the browsers or mobile applications executed thereon.

A merchant webserver provides the target computing resource 802, and the webserver hosts a merchant webpage having corresponding webhooks 804 built into the HTML code generated by the webserver in serving pages provided by the merchant webserver. In an example, the merchant webserver can embed code into the HTML for each of the different pages for the shopping page, the payment page, and a confirmation page, each of these codes triggering different corresponding states for the group sessions.

The webhooks 804 can be flags embedded into the HTML, or can be provided as fields or variables in HTTP GET/POST, or embedded into uniform resource locators (URLs). Upon encountering the webhook 804, a state transition occurs, which can be orchestrated by the orchestrating multiplexer device 806.

The multiplexer device 806 can be a separate, standalone device or service. In this example, the multiplexer device 806 can be provided by a trusted entity, such as a financial institution, and couples to each of the instances to coordinate the transaction. In another variation, one of the instances 808, 810, or 812 can be designated as a primary instance and the multiplexer device 806 operates on or coupled to a device operating the 808, 810, or 812. In this variation, the multiplexer device 806 can run as a separate process to avoid leaking sensitive information to the adjacent individual instance.

In this example, a group session is initiated first by the instances, for example, one of the instances, such as instance 1 808 could be an instance being operated by a classroom teacher who is assigned a role, travel coordinator. Instance 1 808 traverses a corresponding shopping page, and all of instance 1, 2 and 3 are transitioned into a group purchase session through the corresponding webhook 804.

Upon reaching this state, the parties share control and selection of various aspects of the webpage being rendered by webserver 802. In different variations, group annotation capabilities, group chatbot capabilities, etc., can be established by multiplexer 806 or on webserver 802.

The webhook 804 can define different shared fields for the group session to select and to come to agreement on, via for example, role-based control (e.g., travel coordinator can simply pick), or based on voting mechanisms, etc. In this example, the shared fields can include: dateTravelStart, airportArrival, stringFareClass. Certain fields required for the transaction can also be designated as allowing to be dynamic and individually chosen, such as dateTravelEnd, airportDeparture, floatPrice. These can be encapsulated in the webhook itself, flagging dateTravelStart as mandatory group, etc., and these variations can be stored or referenced based on a look up table or other data structure stored on the webserver 802. Each of the instances 808, 810, or 812 can be a browser or a mobile application that couples either to the multiplexer 806 or the webserver 802 directly (or both) and the webhooks can be caught when parsing the rendering code for the page or in the URL for the page, or in a corresponding API message, such as a RESTful message or a SOAP message.

When the group session mandatory information is collated, the webserver 802 can transition to a payment page, which can have webhooks 804 which trigger the second state, the individual state. In the individual state, each of the instances 1, 2, and 3, are able to individually communicate either with the webserver 802 to provide information, or with the multiplexer 806 to prepare the consolidated data package for transmission to the webserver 802. During this state, sensitive information or confidential information can be collated or provided. In the travel example, each of the instances correspond to individual students and their devices, and the students are going on a trip together. Each of the students is able to provide access or upload a copy of their sensitive information, such as passport photos, vaccination information (e.g., Yellow fever certificate), payment information, etc. The information can be provided access in different forms, such as providing the data directly, or providing access to information that is already stored on an always protected data warehouse whose access is managed by the trusted execution environment 816.

Where information is being provided directly to the multiplexer 806, the information can be encrypted or digitally signed by private keys corresponding to public keys of each of the instances 808, 810, and 812, and in some embodiments, the sensitive information can also be encrypted (e.g., using a combined key) using the public key of the webserver 802. Using the combined key is useful where it is not desirable for the multiplexer 806 to have access to the information.

In another variation, information is not provided directly to the multiplexer 806, but rather links in the form of access tokens to the trusted execution environment 816 are provided instead. Different levels of access can be provided, for example, a reduced permissions set of access tokens can be provided to the multiplexer 806 so that overall transaction status across multiple users can be established, and a full set of permissions set of access tokens can be provided ultimately for use by the webserver 802 to access specific underlying information, such as passport and credit card information.

The different access levels can designate for example, to the multiplexer 806 or an instance having a particular role, that the user has a valid passport (e.g., booleanHasPassport), while the webserver 802 is able to access the actual passport number (e.g., integerPassport). The different access levels can modify how a particular field or field value is interacted with in the query response. For example, the integerPassport field can either be queried to obtain the specific value, or to conduct a count, or a Boolean of whether it is not a NULL value, and the trusted execution environment 816 can be configured, for example, using a corresponding custodian data process, to ensure that only specific queries or query results can be provided depending on a role or permission level.

The access tokens can be encryption tokens and include hashed information therein, or represent specific permissions given to various entities for querying the trusted execution environment 816.

For example, the tokens 098f6bcd4621d373cade4e832627b4f6, a94a8fe5ccb19ba61c4c0873d391e987982fbbd3 can be provided to multiplexer 806 by instances 1 and 2, which allows the multiplexer 806 to query the trusted execution environment 816 whether or not instances 1 and 2 have valid travel visas. When multiplexer 806 queries the trusted execution environment 816, the trusted execution environment 816 loads up the corresponding data tables for instances 1 and 2's user data profiles, conducts the query, and outputs the response to multiplexer 806. This can be useful, for example, when the travel coordinator wants to make sure that everyone has the right travel visas, while protecting the privacy of the users by not giving any more information.

During the individual state, in some embodiments, the group session instance (e.g., a Shareboard) can be closed. In another variation, the group session instance is persisted by multiplexer 806 and instead is utilized to show status updates in respect of the purchasing behaviour and status of each of the users (e.g., 1/10 users have purchased, 2/10 users have purchased, 3/10 users have purchased (so the transaction can proceed as minimum quorum has been reached), 4/10 users have purchased, and so on). The group session instance in this example could be a graphical user interface which periodically runs queries or polls the trusted execution environment 816 to provide updated information.

In some embodiments, the target computing resource 802 is able to access certain information associated with the different instances 808, 810, 812, and modify how information is provided to each during the individual state. For example, individualized offers or information can be provided based, for example, on the role of the corresponding user of the instance, such as providing more information (e.g., overall cost for all participants) or a small offer/deal to the travel coordinator (e.g., free breakfast at the hotel). These can be established in the webhooks 804 and triggered during loading of the page elements during the individual state operation of the system.

The individual state ends upon a triggering event, such as a transition into a confirmation page, elapsed time, or other types of triggering event. The confirmation pages can include webhooks 804. When all of the individual instances have reached a particular confirmation page (those that reach it earlier can be shown a waiting room page), the individual instances can optionally revert back to a group confirmation page being provided by the instances operating together in a group session state (either a new group session can be established, or if persisted, the instances can revert back to the group session environment).

In the final state after the transaction is nearing completion and all of the individual instances have resolved in respect of the individual state, the multiplexer 806 can prepare a full data package to the target computing resource/ webserver 802, and the data package can include encrypted information itself, or access tokens and/or links as described in various embodiments herein. For example, the data package can include all of the selection details, as well as encapsulated sensitive or confidential information, which can be used to process the transaction. The data package can utilize mixed levels of encryption or security, having higher levels of protection for information such as passport details, etc. In another variation, the data package includes a first portion of group details, and then a second portion of access tokens and links for the webserver 802 to access to process the transaction.

In a variation, the multiplexer 806 isolates the instances 808, 810, and 812 from the webserver 802 such that all communications are through the multiplexer 806 as an intermediary. This is useful in situations where only the final transaction information package is provided if there all conditions are met, otherwise no information is provided to the webserver 802.

Figure 9:
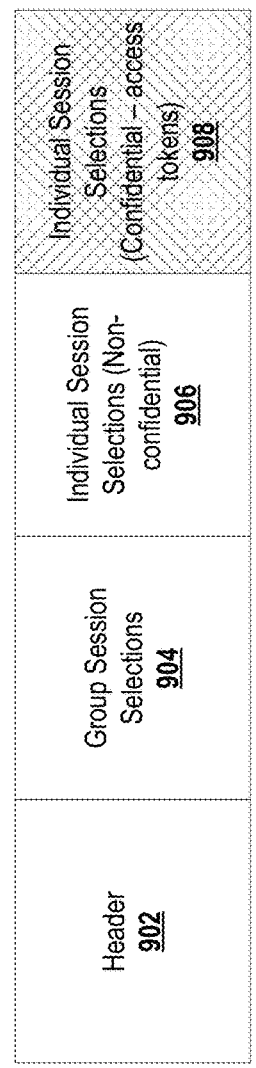
FIG. 9 is an example data structure for the package to be provided to the webserver, according to some embodiments.

FIG. 9 is an example data structure for the package to be provided to the webserver, according to some embodiments. In the data structure 900, header 902 information can be provided, such as IP address, session identifier (session ID=128821), etc. The group session selection information can be provided in 904, such as stringAirportDepart=LGA, stringAirportArrive=ORD.

The individual session selection information that is non-confidential can be provided at 906, for example, such as stringConfirmationNumber=GGWYGZ, and confidential information can be encrypted and/or only provided in the form of links or access tokens at 908. For example, at 908, access tokens may be provided to the webserver 802 so that webserver 802 can run a query against the trusted execution environment 816 to obtain sensitive information, such as passport information, payment information, among others.

Practical use cases of the system are not limited to purchase transactions, and can be used in various situations and scenarios where instances work together both in a group approach and in an individual approach. For example, another practical use case of the system can include a voting mechanism, where each instance can publicly vote but each instance privately validates its identity. In this example, only members of a group, such as members of a union, are able to vote on whether a strike should take place at a particular employer. Another practical use case could include group decision making, such as establishing enough members to establish a sports team, etc. Another practical use case could be a collaborative working environment where members of a group upload their portions of their work (e.g., a production pipeline).

Applicant notes that the described embodiments and examples are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

The term "connected" or "coupled to" may include both direct coupling (in which two elements that are coupled to each other contact each other) and indirect coupling (in which at least one additional element is located between the two elements).

Although the embodiments have been described in detail, it should be understood that various changes, substitutions and alterations can be made herein without departing from the scope. Moreover, the scope of the present application is not intended to be limited to the particular embodiments of the process, machine, manufacture, composition of matter, means, methods and steps described in the specification.

Processes, machines, manufacture, compositions of matter, means, methods, or steps, presently existing or later to be developed, that perform substantially the same function or achieve substantially the same result as the corresponding embodiments described herein may be utilized. Accordingly, the embodiments are intended to include within their scope such processes, machines, manufacture, compositions of matter, means, methods, or steps.

As can be understood, the examples described above and illustrated are intended to be exemplary only.

What is claimed is:

1. A computer implemented system for persisting an instance of a multi-user session between one or more users and a target computing resource, the system including one or more computer processors and computer memory, the system comprising:
    a user device coupling interface configured to communicate with one or more user computing devices, the one or more user computing devices including a primary user computing device that initiates an instance of a direct session between the primary user computing device and the target computing resource;
    a signal interception and injection engine configured to intercept and transform signals communicated between the primary user computing device and the target computing resource;
    a group session coordination engine configured to maintain, in a group session data structure, the instance of the multi-user session as an extrapolation of the direct session between the primary user computing device and the target computing resource whereby data sets corresponding to each of the one or more user computing devices is segregated from the signals communicated between the primary user computing device and the target computing resource;
    the group session coordination engine configured to broadcast portions of the data packets received from the target computing resource to the one or more user computing devices, the broadcasted portions causing rendering of one or more interactive graphical user interface elements at each of the one or more user computing devices;
    the group session coordination engine configured to transform, through the signal interception and injection engine, a data stream provided in the direct session from the primary user computing device to the target computing resource by consolidating data packets received from the one or more user computing devices for transmission to the target computing resource;
    wherein the group session coordination engine includes a multiplexer processor configured to consolidate data packets received from the one or more user computing devices in an encapsulated data payload for transmission to the target computing resource; and
    wherein the encapsulated data payload includes at least one of personal information data sets or individual transaction authorization data sets, and the personal information data sets or individual transaction authorization data sets are provided as access tokens that can be utilized by the target computing resource to receive a query response from a trusted execution environment maintaining an always protected database, the trusted execution environment prohibiting direct access to the always protected database by the target computing resource.

2. The system of claim 1, wherein the group session coordination engine including the multiplexer processor is configured to parse the data packets from the one or more user computing devices or the target computing resource, and flag the data packets corresponding to each of the one or more user computing devices that is sensitive for a particular user or group of users.

3. The system of claim 2, wherein the access tokens that can be utilized by the target computing resource to receive a query response from a trusted execution environment comprise a cryptographically signed message or a public key of the target computing resource.

4. The system of claim 1, wherein the signal interception and injection engine is further configured to route communications for individualized chat sessions between the target computing resource and the one or more user computing devices.

5. The system of claim 1, wherein the group session coordination engine includes a de-multiplexer processor configured to partition the data packets received from the target computing resource establish the portions of the data packets for each individual broadcast to the each computing device of the one or more user computing devices.

6. A computer implemented system for persisting an instance of a multi-user session between one or more users and a target computing resource, the system including one or more computer processors and computer memory, the system comprising:
    a user device coupling interface configured to communicate with one or more user computing devices;
    a signal injection engine configured to intercept and transform signals communicated between one or more user computing devices and the target computing resource;
    a group session coordination engine configured to maintain, in a group session data structure, the instance of the multi-user session;
    the group session coordination engine configured to broadcast portions of the data packets received from the target computing resource to the one or more user computing devices, the broadcasted portions causing rendering of one or more interactive graphical user interface elements at each of the one or more user computing devices;
    the group session coordination engine configured to transform, through the signal interception and injection engine, a data stream provided in the direct session from the primary user computing device to the target computing resource by consolidating data packets received from the one or more user computing devices for transmission to the target computing resource;

wherein the group session coordination engine includes a multiplexer processor configured to consolidate data packets received from the one or more user computing devices in an encapsulated data payload for transmission to the target computing resource; and wherein the encapsulated data payload includes at least one of personal information data sets or individual transaction authorization data sets, and the personal information data sets or individual transaction authorization data sets are provided as access tokens that can be utilized by the target computing resource to receive a query response from a trusted execution environment maintaining an always protected database, the trusted execution environment prohibiting direct access to the always protected database by the target computing resource.

7. The system of claim 6, wherein the group session coordination engine including the multiplexer processor is configured to parse the data packets from the one or more user computing devices or the target computing resource, and flag the data packets corresponding to each of the one or more user computing devices that is sensitive for a particular user or group of users.

8. The system of claim 7, wherein the access tokens that can be utilized by the target computing resource to receive a query response from a trusted execution environment comprise a cryptographically signed message or a public key of the target computing resource.

9. The system of claim 6, wherein the signal interception and injection engine is further configured to route communications for individualized chat sessions between the target computing resource and the one or more user computing devices.

10. The system of claim 6, wherein the group session coordination engine includes a de-multiplexer processor configured to partition the data packets received from the target computing resource establish the portions of the data packets for each individual broadcast to the each computing device of the one or more user computing devices.

11. A computer implemented method for persisting an instance of a multi-user session between one or more users and a target computing resource, the method operating on one or more computer processors and computer memory, the method comprising:

communicating with one or more user computing devices, the one or more user computing devices including a primary user computing device that initiates an instance of a direct session between the primary user computing device and the target computing resource;

intercepting and transforming signals communicated between the primary user computing device and the target computing resource;

maintaining, in a group session data structure, the instance of the multi-user session as an extrapolation of the direct session between the primary user computing device and the target computing resource whereby data sets corresponding to each of the one or more user computing devices is segregated from the signals communicated between the primary user computing device and the target computing resource;

broadcasting portions of the data packets received from the target computing resource to the one or more user computing devices, the broadcasted portions causing rendering of one or more interactive graphical user interface elements at each of the one or more user computing devices; transforming a data stream provided in the direct session from the primary user computing device to the target computing resource by consolidating data packets received from the one or more user computing devices for transmission to the target computing resource;

consolidating data packets received from the one or more user computing devices in an encapsulated data payload for transmission to the target computing resource; and wherein the encapsulated data payload includes at least one of personal information data sets or individual transaction authorization data sets, and the personal information data sets or individual transaction authorization data sets are provided as access tokens that can be utilized by the target computing resource to receive a query response from a trusted execution environment maintaining an always protected database, the trusted execution environment prohibiting direct access to the always protected database by the target computing resource.

12. The method of claim 11, comprising parsing the data packets from the one or more user computing devices or the target computing resource, and flagging the data packets corresponding to each of the one or more user computing devices that is sensitive for a particular user or group of users.

13. The method of claim 12, wherein the access tokens that can be utilized by the target computing resource to receive a query response from a trusted execution environment comprise a cryptographically signed message or a public key of the target computing resource.

14. The method of claim 11, comprising routing communications for individualized chat sessions between the target computing resource and the one or more user computing devices.

15. The method of claim 11, comprising partitioning the data packets received from the target computing resource establish the portions of the data packets for each individual broadcast to the each computing device of the one or more user computing devices.

16. A computer implemented method for persisting an instance of a multi-user session between one or more users and a target computing resource, the method operating on one or more computer processors and computer memory, the method comprising:

establishing communication pathways with one or more user computing devices;

transforming signals communicated between one or more user computing devices and the target computing resource;

maintaining, in a group session data structure, the instance of the multi-user session;

broadcasting portions of the data packets received from the target computing resource to the one or more user computing devices, the broadcasted portions causing rendering of one or more interactive graphical user interface elements at each of the one or more user computing devices;

encapsulating a data stream provided to the target computing resource by consolidating data packets received from the one or more user computing devices for transmission to the target computing resource;

consolidating data packets received from the one or more user computing devices in an encapsulated data payload for transmission to the target computing resource; and wherein the encapsulated data payload includes at least one of personal information data sets or individual transaction authorization data sets, and the personal information data sets or individual transaction authorization data sets are provided as access tokens that can be utilized by the target computing resource to receive a query response from a trusted execution environment maintaining an always protected database, the trusted execution environment prohibiting direct access to the always protected database by the target computing resource.

17. The method of claim 16, comprising parsing the data packets from the one or more user computing devices or the target computing resource, and flagging the data packets corresponding to each of the one or more user computing devices that is sensitive for a particular user or group of users.

18. The method of claim 17, wherein the access tokens that can be utilized by the target computing resource to receive a query response from a trusted execution environment comprise a cryptographically signed message or a public key of the target computing resource.

19. A non-transitory computer readable medium storing machine interpretable instructions, which when executed by one or more processors, cause the one or more processors to perform a method for persisting an instance of a multi-user session between one or more users and a target computing resource, the method comprising:
  communicating with one or more user computing devices, the one or more user computing devices including a primary user computing device that initiates an instance of a direct session between the primary user computing device and the target computing resource;
  intercepting and transforming signals communicated between the primary user computing device and the target computing resource;
  maintaining, in a group session data structure, the instance of the multi-user session as an extrapolation of the direct session between the primary user computing device and the target computing resource whereby data sets corresponding to each of the one or more user computing devices is segregated from the signals communicated between the primary user computing device and the target computing resource;
  broadcasting portions of the data packets received from the target computing resource to the one or more user computing devices, the broadcasted portions causing rendering of one or more interactive graphical user interface elements at each of the one or more user computing devices;
  transforming a data stream provided in the direct session from the primary user computing device to the target computing resource by consolidating data packets received from the one or more user computing devices for transmission to the target computing resource;
  consolidating data packets received from the one or more user computing devices in an encapsulated data payload for transmission to the target computing resource; and
  wherein the encapsulated data payload includes at least one of personal information data sets or individual transaction authorization data sets, and the personal information data sets or individual transaction authorization data sets are provided as access tokens that can be utilized by the target computing resource to receive a query response from a trusted execution environment maintaining an always protected database, the trusted execution environment prohibiting direct access to the always protected database by the target computing resource.

20. A non-transitory computer readable medium storing machine interpretable instructions, which when executed by one or more processors, cause the one or more processors to perform a method for persisting an instance of a multi-user session between one or more users and a target computing resource, the method comprising:
  establishing communication pathways with one or more user computing devices;
  intercepting and transforming signals communicated between one or more user computing devices and the target computing resource;
  maintaining, in a group session data structure, the instance of the multi-user session;
  broadcasting portions of the data packets received from the target computing resource to the one or more user computing devices, the broadcasted portions causing rendering of one or more interactive graphical user interface elements at each of the one or more user computing devices;
  encapsulating a data stream provided to the target computing resource by consolidating data packets received from the one or more user computing devices for transmission to the target computing resource;
  consolidating data packets received from the one or more user computing devices in an encapsulated data payload for transmission to the target computing resource; and
  wherein the encapsulated data payload includes at least one of personal information data sets or individual transaction authorization data sets, and the personal information data sets or individual transaction authorization data sets are provided as access tokens that can be utilized by the target computing resource to receive a query response from a trusted execution environment maintaining an always protected database, the trusted execution environment prohibiting direct access to the always protected database by the target computing resource.

\* \* \* \* \*